United States Patent [19]
Viets

[11] 3,940,060
[45] Feb. 24, 1976

[54] VORTEX RING GENERATOR

[76] Inventor: Hermann Viets, 2511 S. Patterson Blvd., Dayton, Ohio 45409

[22] Filed: Aug. 23, 1974

[21] Appl. No.: 499,939

[52] U.S. Cl. .................................. 239/14; 46/9
[51] Int. Cl.² ................................... E01H 13/00
[58] Field of Search ........... 239/14, 2, 135, 99, 101, 239/456; 46/9

[56] References Cited

UNITED STATES PATENTS

| | | | |
|---|---|---|---|
| 3,372,873 | 3/1968 | Weiss et al. | 46/9 X |
| 3,566,768 | 3/1971 | Walpole, Jr. | 239/14 |
| 3,589,603 | 6/1971 | Fohl | 239/1 |
| 3,804,328 | 4/1974 | Lane et al. | 239/2 R |

*Primary Examiner*—John J. Love
*Attorney, Agent, or Firm*—Joseph E. Rusz; Arsen Tashjian

[57] ABSTRACT

A vortex generator including a heat source in the base of a cylindrical member with a circular ringwing in the shape of an airfoil which is lifted upward and then impulsively released to move rapidly downward and thus generate a vortex behind it. The vorticity in the core of the vortex is highly concentrated and moves rapidly upward through cloud cover. A strong light in the center of the vortex will shine to great heights making it especially useful as an airport beacon or the like. When the invention is used with a chimney, the effluents therein are caused to proceed rapidly upward through atmospheric obstacles such as thermal inversions which have been cleared by the action of the vortex.

6 Claims, 10 Drawing Figures

VORTEX RING GENERATOR

STATEMENT OF GOVERNMENT INTEREST

The invention described herein may be manufactured and used by or for the United States Government for governmental purposes without the payment of any royalty thereon.

BACKGROUND OF THE INVENTION

This invention relates to a device for generating hot vortex rings of highly concentrated vorticity and, more particularly the invention is concerned with providing a means for generating and propelling vortex rings through cloud cover or atmospheric obstacles to create a column of relatively clear air through which a light may be projected or through which smokestack effluents may be propelled.

It is a well known fact that it is more dangerous to land an aircraft at times of limited visibility especially low ceiling night time conditions. Under these adverse conditions, presently available beacons must be extremely powerful in order to be seen by the pilot and most times the aircraft must be brought to low altitudes before visual contact can be made with the lights on the landing runway.

It would be most desirable to provide a means for penetrating the low ceiling with the airport beacons so that the pilot could see the outline of the airport runway from relatively high altitudes and thereby accurately guide the aircraft from early in the landing approach. Thus, it can be seen that presently available unaugmented systems of high intensity lights would be significantly improved if the effective penetration of the light beacon could be substantially increased. The hereinafter described invention accomplished this desirable result.

Now considering the use of the invention on a chimney or smokestack, it should be noted that the structures are built to great heights in an attempt to carry effluents into the upper atmosphere far away from the earth's surface. In certain areas, particularly those subject to relatively frequent thermal inversions, many times the effluents become trapped in the lower atmosphere and pollute the earth's surface even though they are released at the outlet of a chimney of great height. Thus, it would be desirable to provide a means for propelling the effluents in the chimney through a greater distance before being overcome by viscosity. In this way shorter smokestacks could be used even on days when their use would ordinarily cause widespread pollution at ground level. The hereinafter described invention shows a means for greatly reducing the amount of ground level pollution by enabling the smokestack effluents to penetrate atmospheric obstacles such as thermal inversions.

SUMMARY OF THE INVENTION

The present invention provides a cloud cannon suitable for use as an airport beacon or as a means for clearing the atmosphere during the release of effluents through a chimney. The basic feature of the device is a vortex generator which includes a circular ringwing which is impulsively accelerated downward and thus produces a circular starting vortex ring with highly concentrated vorticity. The ringwing is essentially an airfoil formed in a circular shape. The starting vortex behind such a device has been shown to contain highly concentrated vorticity and thus persist for large distances.

Accordingly, it is an object of the invention to provide a cloud cannon capable of generating hot vortex rings of highly concentrated vorticity.

Another object of the invention is to provide an airport beacon wherein vortex rings are propelled through a cloud cover to produce a column of relatively clear air. A strong beam of light is projected along this column and thus acts as a beacon to position aircraft about an airport in times of low visibility and especially when instruments are inoperable or faulty.

Still another object of the invention is to provide a vortex ring generator suitable for attachment to a chimney for the purpose of propelling the effluents to a higher altitude before they disperse. The novel generating process produces a vortex ring of highly concentrated vorticity which enables the ring to be transported to much higher altitudes before being dispersed by viscosity.

A further object of the invention is to provide a vortex ring generator of highly concentrated vorticity wherein the high temperature rings can be generated in variable sizes not dependent upon the size of the exit where the fluid is expelled.

Another further object of the invention is to provide a cloud cannon including a vortex ring generator with an airport beacon for mounting on a truck bed enabling its use as a helicopter beacon as well as other remote mobile service operations.

Another still further object of the invention is to provide a vortex ring generator including a ringwing in the shape of a circular airfoil which is impulsively accelerated downward by means of springs thereby producing a strong starting vortex behind it.

These and other objects, features and advantages will become more apparent after considering the following description taken in conjunction with the annexed drawings and appended claims.

DESCRIPTION OF A PREFERRED EMBODIMENT

Figure 1:
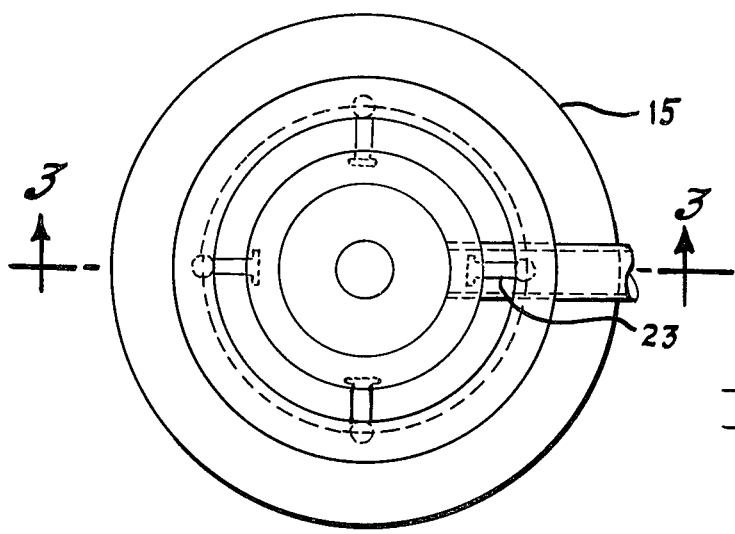
FIG. 1 is a top view of the apparatus according to the invention.
Figure 2:
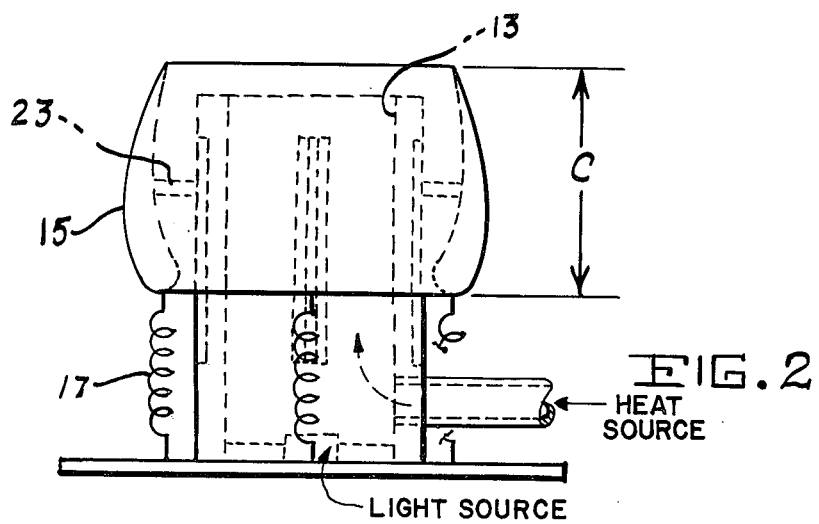
FIG. 2 is a side view of vortex ring generator showing the shaped ringwing and the spring arrangement used to accelerate it downward to create the vortex.
Figure 3:
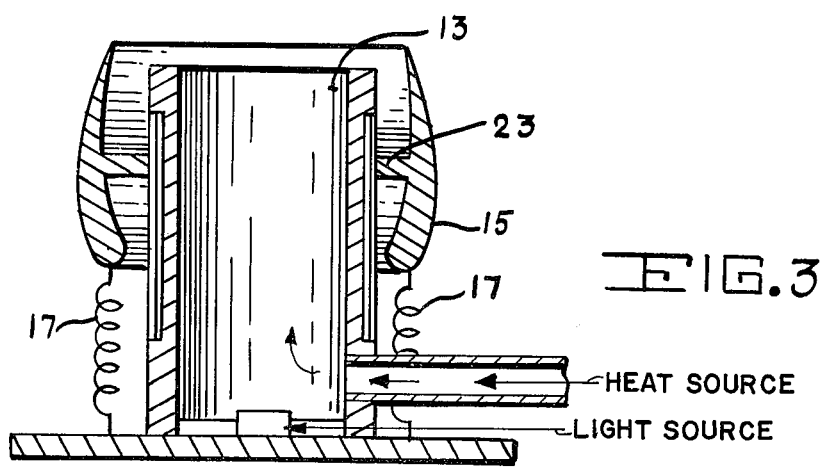
FIG. 3 is a cross-sectional view of the device taken along the line 3—3 of FIG. 1.

Referring now to the drawings, FIGS. 1, 2 and 3 depict one embodiment of the cloud cannon vortex ring generator which is especially useful as an airport beacon. The invention includes a circular cylinder 13 containing a heat source enclosed by a circular ringwing 15 mounted on a mechanism which impulsively accelerates the ringwing 15 downward or forward in terms of the airfoil cross-sectional shape of the ringwing 15. The downward acceleration is accomplished by four springs 17 situated about the circumference of the ringwing 15.

The ringwing 15 is carried upward by a suitable mechanism and upon release thereof, it rapidly descends and creates a strong starting vortex behind it. The vorticity within the core of this vortex is highly concentrated and the vortex moves rapidly upward. A chain of vortices thus produced causes the hot air produced by the heat source such as a gas burner, for example, to rise in a column above the deivce. A lamp located in the center of the heat source shines through the column of clear air thus produced. In addition, different lamp colors can be used to distinguish various beacons.

Figure 4:
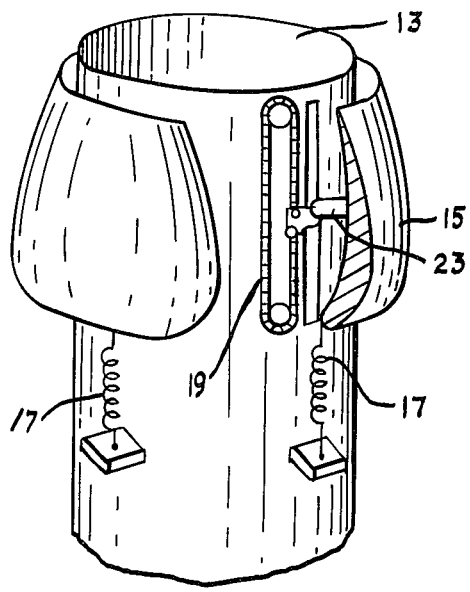
FIG. 4 is a view partially cutaway to show details of one mechanism which can be used to raise the ringwing.
Figure 5:
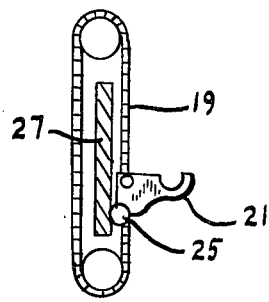
FIG. 5 is a side view in detail of the motor driven chain and carrier arm which lifts the ringwing and releases it when it reaches the top of its stroke.

Some details of the mechanisms used to raise the ringwing 15 into position are shown in FIGS. 4, 5, 6 and 7. In FIGS. 4 and 5, the mechanism is basically a motor driven chain 19 with a carrier arm 21 attached. Each carrier arm 21 is hingedly attached to the chain 19 and catches one of the support arms 23 of the ringwing 15 at its lowest position. The ringwing 15 is thus raised until the wheel 25 on the carrier arm 21 reaches the top of the stop 27 at which time the arm 21 drops away and the ringwing 15 rapidly descends, generating the vortex behind it. The frequency of the generating process may be regulated by adjusting the speed of the chain drive.

Figure 6:
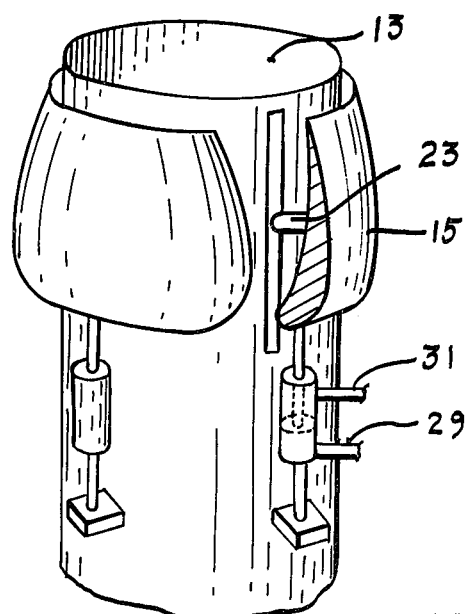
FIG. 6 is an alternative means for driving the ringwing with compressed air or steam.
Figure 7:
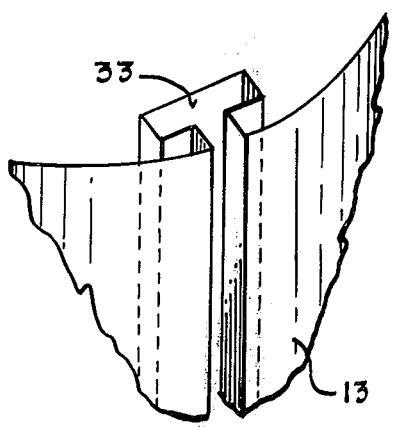
FIG. 7 is a detail view of the channel arrangement by which the ringwing is guided.

An alternative method of driving the ringwing 15 is shown in FIG. 6. In this case the driving force is supplied by compressed gas or steam. To raise the ringwing 15, high pressure gas is introduced through port 29 and introducing the gas into port 31 lowers the ringwing 15. A detail of the track 33 for either driving mechnism is shown in FIG. 7.

Figure 8:
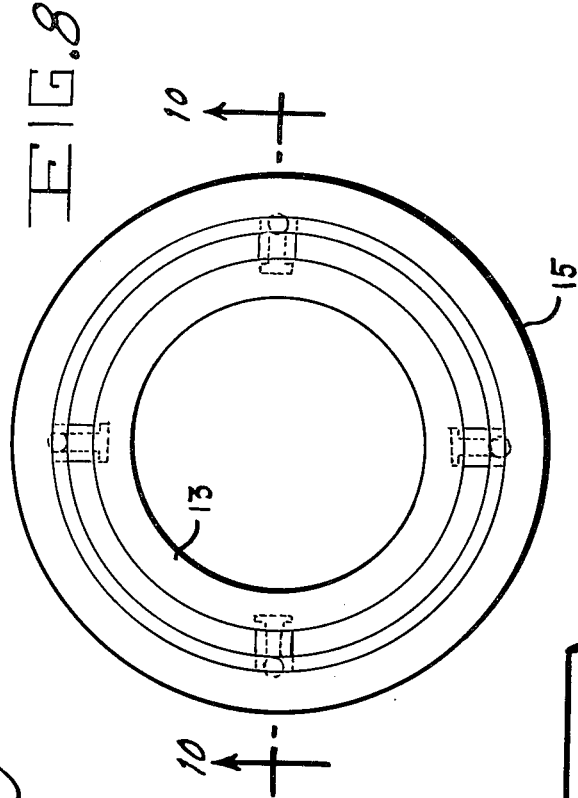
FIG. 8 is a top view of the vortex generator attached to a chimney top.
Figure 9:
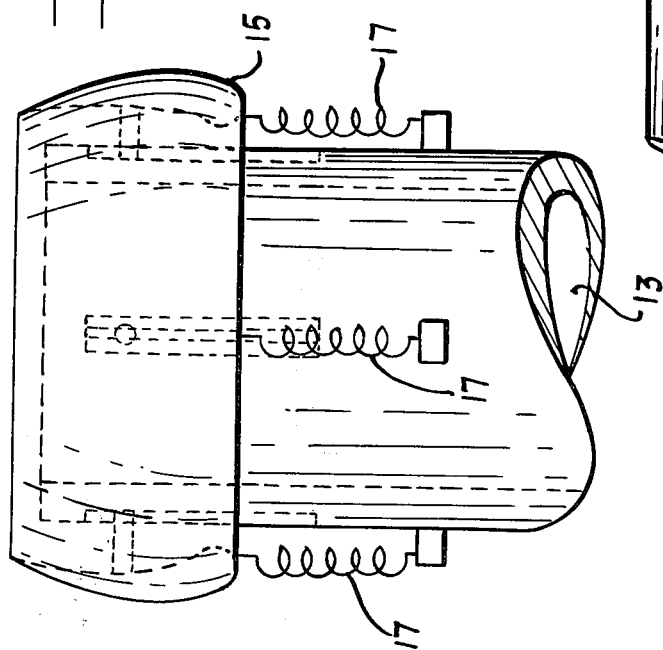
FIG. 9 is a side view of the vortex generator attached to a chimney top.
Figure 10:
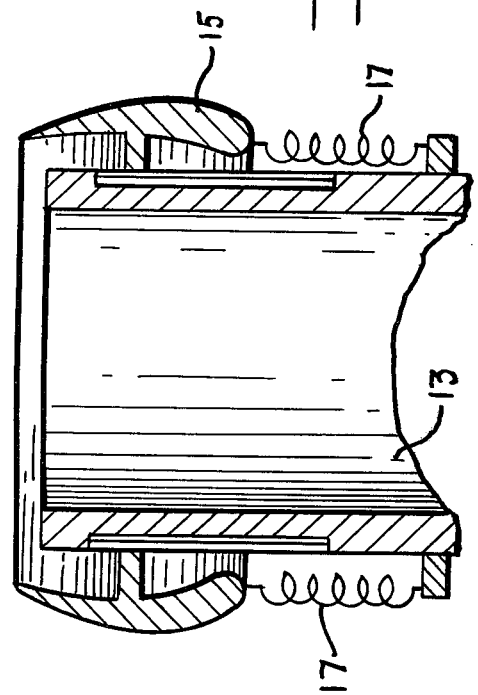
FIG. 10 is a view in cross-section taken along the line 10—10 of FIG. 8.

The apparatus may also be applied at the end of a chimney and impulsively moved downward or forward in terms of the airfoil cross-section of the ringwing 15 to generate a starting vortex which then proceeds upward, causing the chimney effluents to do the same. The device is shown in FIGS. 8, 9 and 10. The ringwing 15 is placed with its leading edge directed downward. The springs 17 are attached to the leading edge at four positions as shown in FIG. 10. The ringwing 15 is raised and released periodically to generate vortex rings.

It should be noted that the hereinbefore described cloud cannon, whether used as an airport beacon or on a chimney, can be alternately constructed by mounting the ringwing 15 inside the circular cylinder 13 or chimney. The driving mechanism is essentially the same except that it is mounted inside the cylinder.

Although the invention has been illustrated in the accompanying drawings and described in the foregoing specification in terms of preferred embodiments thereof, the invention is not limited to these embodiments or to the particular configurations mentioned. It will be apparent to those skilled in the art that my invention produces a vortex ring having highly concentrated vorticity and the vortex ring is much hotter than the conventional ring which is produced by a pressure pulse over a circular opening. The classical method of producing vortex rings allows the fluid in the circular opening to mix with the ambient fluid while the jet is being formed. Also, the process of formation takes place over a length scale approximately equal to the length scale of the opening. Therefore, the conventional ring has neither the concentrated vorticity nor the high temperature core characteristics of the vortex generator according to my invention.

It should be understood that various changes, alterations and substitutions, particularly with respect to the construction details, can be made in the arrangement of the several elements without departing from the true spirit and scope of the appended claims.

Having thus described my invention, what I claim and desire to secure by Letters Patent of the United States is:

1. A vortex ring generator for use in clearing atmospheric obstacles in the path thereof, said vortex generator comprising a circular cylinder having a heat source in the base thereof, a ringwing surrounding the upper portion of said circular cylinder, and means for periodically raising and rapidly lowering said ringwing at a predetermined frequency rate to create a vortex therebehind, said vortex being highly concentrated for rapid upward movement thereby clearing the atmosphere for relatively great distances above the vortex generator.

2. The vortex ring generator defined in claim 1 wherein said ringwing is configurated in the shape of an airfoil.

3. The vortex ring generator defined in claim 2 wherein the means for raising and lowering said ringwing includes a motor driven chain on said circular cylinder for periodically raising said ringwing to a position at the open upper end of said cylinder and a plurality of springs for rapidly lowering said ringwing.

4. The vortex ring generator defined in claim 2 wherein the means for raising and lowering said ringwing includes a plurality of double-acting hydraulic cylinders operatively connected to said ringwing, such that the introduction of fluid under pressure to one end of said hydraulic cylinders causes said ringwing to move upward and the introduction of fluid under pressure to the other end of said hydraulic cylinders causes said ringwing to move rapidly downward.

5. The vortex ring generator defined in claim 2 wherein a light source is positioned in the lower end of said circular cylinder, said light shining through the atmosphere above said circular cylinder cleared by said vortex thereby serving as an airport beacon.

6. The vortex ring generator defined in claim 2 wherein said circular cylinder operates as a chimney and said vortex generator is attached to the upper portion thereof, thereby clearing the atmosphere to allow effluents from the chimney to reach relatively great heights after being propelled by the vortex.

* * * * *